(12) United States Patent
Tripathi et al.

(10) Patent No.: US 10,019,086 B2
(45) Date of Patent: *Jul. 10, 2018

(54) ELECTRONIC DEVICES WITH ADAPTIVE FRAME RATE DISPLAYS

(71) Applicant: Apple Inc., Cupertino, CA (US)

(72) Inventors: Brijesh Tripathi, San Jose, CA (US); Jean-Pierre S. Guillou, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/167,775

(22) Filed: May 27, 2016

(65) Prior Publication Data

US 2016/0274690 A1 Sep. 22, 2016

Related U.S. Application Data

(63) Continuation of application No. 13/438,409, filed on Apr. 3, 2012, now Pat. No. 9,355,585.

(51) Int. Cl.
*G06F 3/038* (2013.01)
*G06F 3/041* (2006.01)
(Continued)

(52) U.S. Cl.
CPC ............ *G06F 3/041* (2013.01); *G06T 19/006* (2013.01); *G09G 3/20* (2013.01);
(Continued)

(58) Field of Classification Search
CPC .. G09G 3/2074; G09G 3/3426; G09G 3/3685; G09G 2340/0435; G09G 3/342; G09G 2300/0443; G09G 2320/0252; G09G 2320/0261; G09G 2320/028; G09G 2340/16; G09G 3/3659; G09G 2320/106; G09G 3/3648; G09G 2300/0842; G09G 2300/0852; G09G 2310/024
See application file for complete search history.

(56) References Cited

U.S. PATENT DOCUMENTS 9,313,376 B1 * 4/2016 Bertolami .......... H04N 1/00161
2006/0146056 A1 * 7/2006 Wyatt .................... G09G 5/006
345/501

(Continued)

*Primary Examiner* — Md Saiful A Siddiqui
(74) *Attorney, Agent, or Firm* — Fletcher Yoder PC

(57) ABSTRACT

An electronic device may be provided with a display. The display may be a variable frame rate display capable of adaptively adjusting a frame rate at which display frames are displayed in response to information associated with the current state of operation of the device. The information may be gathered using control circuitry in the electronic device. The control circuitry may gather the information for adjusting the frame rate by monitoring the electronic device power supply configuration, other device components, the type of content to be displayed, and user-input signals. The control circuitry may adjust the frame rate based on the gathered information by increasing or decreasing the frame rate. The control circuitry may be formed as a portion of display control circuitry for the device such as a display driver integrated circuit or may be formed as a portion of storage and processing circuitry external to the display.

18 Claims, 21 Drawing Sheets

(51) Int. Cl.
*G09G 3/20* (2006.01)
*G06T 19/00* (2011.01)

(52) U.S. Cl.
CPC ........... *G09G 2320/029* (2013.01); *G09G 2320/0606* (2013.01); *G09G 2320/0613* (2013.01); *G09G 2320/103* (2013.01); *G09G 2330/02* (2013.01); *G09G 2330/021* (2013.01); *G09G 2340/0435* (2013.01); *G09G 2354/00* (2013.01); *G09G 2360/18* (2013.01)

(56) References Cited

U.S. PATENT DOCUMENTS

| | | | | |
|---|---|---|---|---|
| 2009/0087016 | A1* | 4/2009 | Berestov | G06K 9/00664 382/100 |
| 2011/0157253 | A1* | 6/2011 | Yamazaki | G02F 1/133555 345/690 |
| 2012/0069171 | A1* | 3/2012 | Kodaira | G02B 21/365 348/79 |
| 2012/0147020 | A1* | 6/2012 | Hussain | G06T 1/00 345/522 |
| 2012/0162396 | A1* | 6/2012 | Huang | H04N 13/026 348/51 |
| 2012/0194706 | A1* | 8/2012 | Kwak | H04N 1/32101 348/239 |
| 2012/0243802 | A1* | 9/2012 | Fintel | H04N 5/2625 382/284 |
| 2012/0262592 | A1* | 10/2012 | Rabii | H04N 5/23241 348/208.16 |

* cited by examiner

ELECTRONIC DEVICES WITH ADAPTIVE FRAME RATE DISPLAYS

CROSS-REFERENCE TO RELATED APPLICATION

This is a continuation of U.S. patent application Ser. No. 13/438,409, filed Apr. 3, 2012, entitled "ELECTRONIC DEVICES WITH ADAPTIVE FRAME RATE DISPLAYS," which is incorporated herein for all purposes.

BACKGROUND

This relates generally to displays, and more particularly, to electronic devices with displays.

Electronic devices such as computers, televisions, portable computers, and cellular telephones are often provided with displays. A display often includes a frame buffer for buffering information to be displayed on the display and display driver circuitry that periodically refreshes display pixels in the display. The frequency at which the display pixels are periodically refreshed is commonly called the frame rate of the display.

Conventional displays use a fixed standard frame rate such as the 24 frames-per-second frame rate that is often used for displaying television and movie content. In some scenarios a user may be able to select a fixed frame rate for a display from a set of fixed standard frame rates that are available for that display.

However, in some scenarios, display content or other operating environment characteristics of a device may change during operation of an electronic device resulting in a configuration for which a different frame rate for the display may be desirable. Changes of this type may occur on time scales that are too short for a user of a device to effectively choose a frame rate for each configuration.

It would therefore be desirable to be able to provide improved displays for electronic devices.

SUMMARY

Electronic devices may be provided that contain displays. The display may include display pixels and display driver circuitry for operating the display pixels. The electronic device may include control circuitry. The control circuitry may monitor the device operating environment and other aspects of the operation of the electronic device. The control circuitry may configure operational attributes of the display in response to monitored operating environment information or other information obtained while monitoring the operation of the electronic device.

The display driver circuitry may operate the display pixels by periodically refreshing light-emitting elements in the display. The frequency at which the display control circuitry refreshes the light-emitting elements of the display may be referred to as the display frame rate or the frame rate. Configuring operational attributes of the display may include increasing or decreasing the display frame rate of the display.

Monitoring the device operating environment and other aspects of the operation of the electronic device may include monitoring the status of a frame buffer that stores display data to be displayed on the display, monitoring the type of display content to be displayed with the display, monitoring user-input signals, monitoring the device power supply status, and/or monitoring other aspects of the operation of the electronic device.

In some situations, the control circuitry may reduce the display frame rate in response to detection of, for example, static display content to be displayed. Static display content may include static text, a static web browser webpage or other stationary display content. Reducing the display frame rate may reduce power consumption for the device and may allow powering down of memory needed for storing display data to be displayed.

In some situations, the control circuitry may increase the display frame rate in response to detection of, for example, dynamic display content to be displayed. Dynamic display content may include scrolling content, video content, common-vector motion content, or other non-stationary display content. Increasing the display frame rate may result in a higher perceived display resolution for a user of the electric device.

Further features of the invention, its nature and various advantages will be more apparent from the accompanying drawings and the following detailed description of the preferred embodiments.

DETAILED DESCRIPTION

Electronic devices such as cellular telephones, media players, computers, set-top boxes, wireless access points, and other electronic equipment may be provided displays. Displays may include liquid-crystal display (LCD) screens, light-emitting diodes (LEDs), organic light-emitting diodes (OLEDs), and other components such as touch-sensitive components that present visual information and status data and/or gather user input data.

Operational attributes of the display such as the display frame rate (i.e., the frequency at which display signals are provided to display pixels) may be controlled and configured by control circuitry in the electronic device. Operational status information may be gathered using control circuitry in the electronic device that monitors the operation of the device. The control circuitry may adjust the display frame rate (also sometimes referred to herein as the frame rate, the display refresh rate, or the refresh rate) in response to the operational status information.

Figure 1:
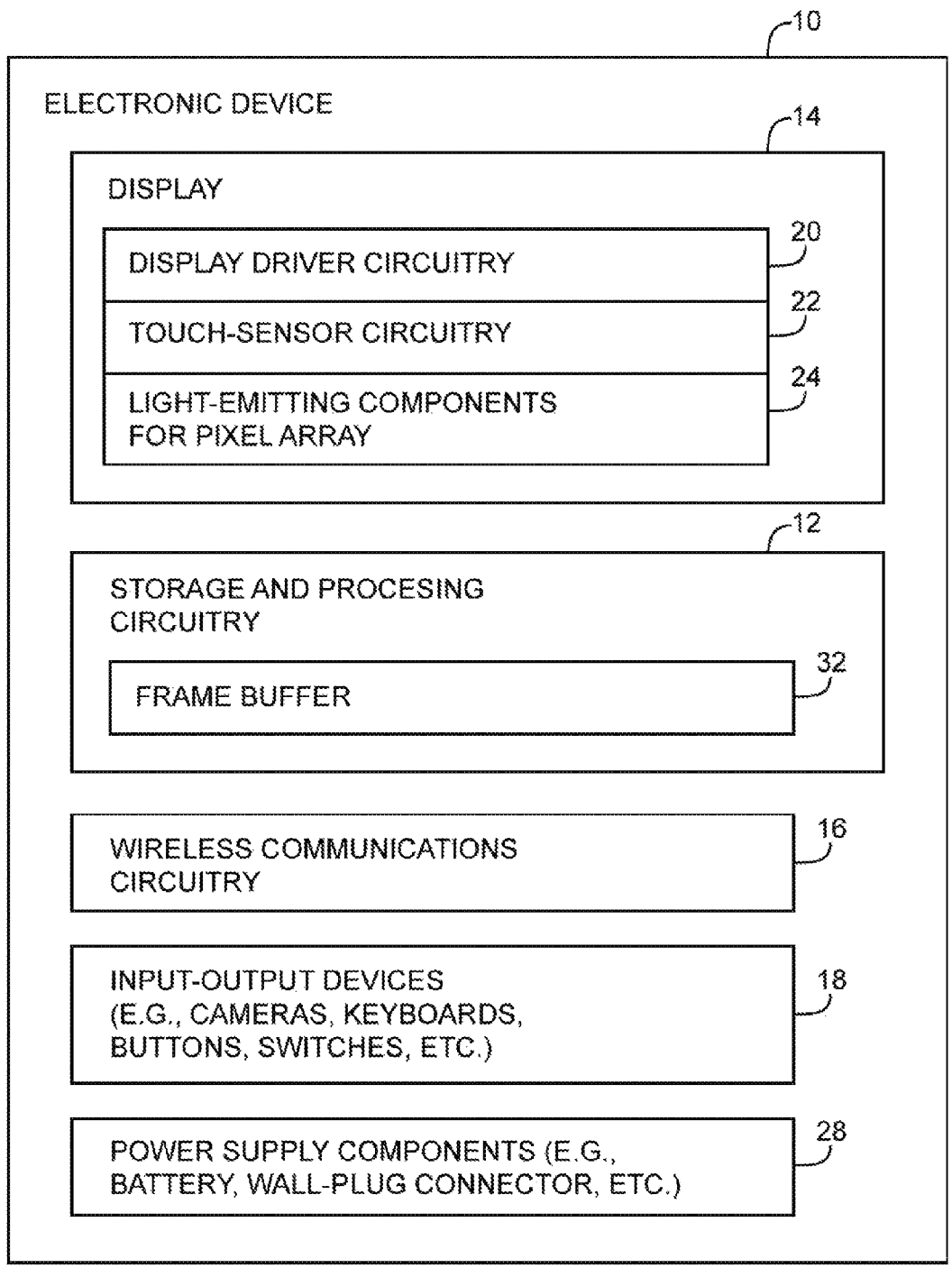
FIG. 1 is a diagram of an illustrative electronic device having a display in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may include light-emitting components 24, touch-sensor circuitry 22, display driver circuitry 20 for operating display 14, and other display components. Display 14 may be a variable frame rate display operable to display content using an adjustable frame rate.

Light-emitting components 24 may include an array of display pixels formed from reflective components, liquid crystal display (LCD) components, organic light-emitting diode (OLED) components, or other suitable display pixel structures. To provide display 14 with the ability to display color images, light-emitting components 24 may include display pixels having color filter elements. Display touch-sensor circuitry 22 may include capacitive touch electrodes (e.g., indium tin oxide electrodes or other suitable transparent electrodes) or other touch sensor components (e.g., resistive touch technologies, acoustic touch technologies, touch sensor arrangements using light sensors, force sensors, etc.). Display 14 may be a touch screen that incorporates display touch circuitry 22 or may be a display that is not touch sensitive.

Display driver circuitry 20 may include a driver integrated circuit that is mounted, for example, to a display layer such as a thin-film-transistor layer of a liquid crystal display. Display driver circuitry 20 may include display pixel control lines and other circuitry for operating the display pixels of display 14. Display driver circuitry 20 may be coupled to control circuitry such as storage and processing circuitry 12 in device 10.

Display 14 may include additional circuitry such as demultiplexer circuitry, display signal lines for delivering display signals to light-emitting components 24 (FIG. 1), and gate driver circuitry. Display driver circuitry 20 may be implemented using one or more integrated circuits (ICs) and may sometimes be referred to as a driver IC, display driver integrated circuit, or display driver. Display driver integrated circuit 20 may be mounted on an edge of a thin-film transistor substrate layer in display 14 (as an example). The thin-film transistor substrate layer may sometimes be referred to as a thin-film transistor (TFT) layer.

During operation of device 10, control circuitry such as storage and processing circuitry 12 may provide data to display driver 20. For example, circuitry 12 may supply display driver 20 with digital data corresponding to text, graphics, video, or other images to be displayed on display 14. Display driver 20 may convert the data that is received into signals for controlling the display pixels.

During the process of displaying images on display 14, display driver integrated circuit 20 may receive digital data from circuitry 12 and may produce corresponding analog data (e.g., voltages with magnitudes representing pixel brightness levels) for light-emitting components 24. The analog data signals may be demultiplexed to produce corresponding color-coded analog data line signals (e.g., data signals for a red channel, data signals for a green channel, and data signals for a blue channel).

Storage and processing circuitry 12 may include microprocessors, microcontrollers, digital signal processor integrated circuits, application-specific integrated circuits, and other processing circuitry. Volatile and non-volatile memory circuits such as random-access memory, read-only memory, hard disk drive storage, solid state drives, and other storage circuitry may also be included in processing circuitry 12.

Processing circuitry 12 may use wireless communications circuitry 16 and/or input-output devices 18 to obtain user input and to provide output to a user. Input-output devices 18 may include speakers, microphones, sensors, buttons, keyboards, displays, touch sensors, and other components for receiving input and supplying output. Wireless communications circuitry may include wireless local area network transceiver circuitry, cellular telephone network transceiver circuitry, and other components for wireless communication.

Storage and processing circuitry 12 may include one or more frame buffers such as frame buffer 32 for temporarily storing display data to be displayed on display 14. Display content may be generated or received by circuitry 12 and stored, frame-by-frame, in frame buffer 32. Display driver circuitry 20 may generate display signals for light-emitting components 24 based on the display data stored in frame buffer 32. Display driver circuitry 20 may receive display data from frame buffer 32 and provide display signals associated with that received display data to light-emitting components 24 at a display refresh rate (also referred to herein as a display frame rate or frame rate).

Storage and processing circuitry 12 may be implemented separately from display 14 or may include portions that are integrated with display driver circuitry 20 of display 14.

Device 10 may include power supply components 28 for supplying power to device 10. Power supply components 28 may include one or more batteries or other charge storage devices, a line power supply such as a cable with a plug (e.g., a wall plug or an automobile outlet plug) for connecting device 10 to an electrical outlet, or other power supply components. Processing circuitry 12 may be configured to manage power delivery to device 10 when, for example, device 10 is connected to both a battery and an electrical outlet, or when a device is connected to, or disconnected from, an electrical outlet during operation.

Device 10 may include monitoring circuitry for monitoring the operation of the electronic device. The monitoring circuitry may be formed as a portion of storage and processing circuitry 12, as a portion of display driver circuitry 20, as a separate integrated circuit (e.g., an integrated circuitry mounted on a printed circuit board or on a rigid layer of display 14), or may be a system monitoring engine implemented in part or completely using software running on processing circuitry 12.

Control circuitry such as storage and processing circuitry 12 may be used in running software for device 10. For example, circuitry 12 may be configured to execute code in connection with the displaying of images on display 14 (e.g., text, pictures, video, etc.).

Circuitry 12 may be used to monitor various attributes of the operation of the electronic device such as the activity of frame buffer 32 (e.g., the rate at which the frame buffer is updated with new display data to be displayed display), the type of display content to be displayed with the display (e.g., dynamic content, video content, high-frame-rate video content, common-vector motion content, and static content), user-input signals such as touch-sensor input signals, the device power supply status, and/or other aspects of the operating environment of the electronic device.

Circuitry 12 may configure operational attributes of the display such as the display frame rate in response to monitored operating information gathered by circuitry 12. For example, circuitry 12 may increase or decrease the frame rate for the display when displaying static or moving (dynamic) display content respectively.

Control circuitry 12 may be used to monitor operating environment attributes and other aspects of device operations (e.g., the rate at which new display data is provided to frame buffer 32, the display content being delivered to frame buffer 32, user-input signals, the operational status of other components, and the device power supply status) and provide signals to display driver circuitry 20 resulting in an increased or decreased the display frame rate. Increasing the display frame rate may result in a higher perceived display resolution for a user of the electric device. Decreasing the display frame rate may reduce power consumption for the device and may allow powering down of memory associated with, for example, frame buffer 32.

Figure 2:
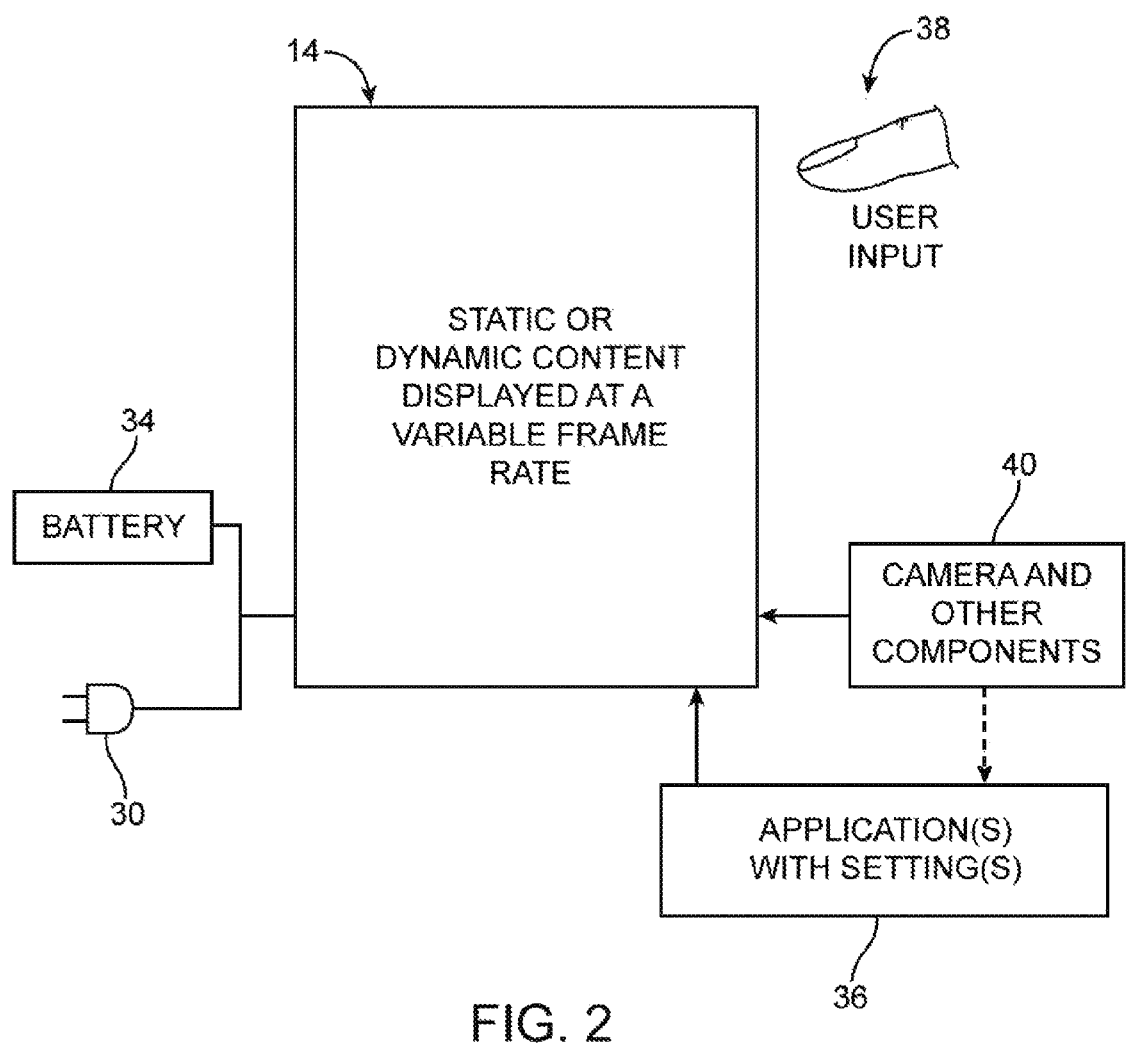
FIG. 2 is a schematic diagram of illustrative operational attributes of a device of the type shown in FIG. 1 that may be used in determining a frame rate for the display in accordance with an embodiment of the present invention.

FIG. 2 is a diagram showing examples of operating environment attributes and other aspects of device operations for a device of the type shown in FIG. 1 that may be monitored for determining a frame rate for display 14. As shown in FIG. 2, display 14 may be used for displaying static content or dynamic content at a variable frame rate.

The variable frame rate may be actively determined during operation of device 10 based on whether static or dynamic display content is to be displayed, based on whether device 10 is receiving power from a battery such as battery 34 or a power cable such as power cable 30, based on user input such as a swipe by a user finger 38, based on the operational status of other device components 40 such as a camera, a video card, or other components, or based on whether one or more particular software applications 36 with one or more settings has been launched.

Figure 3:
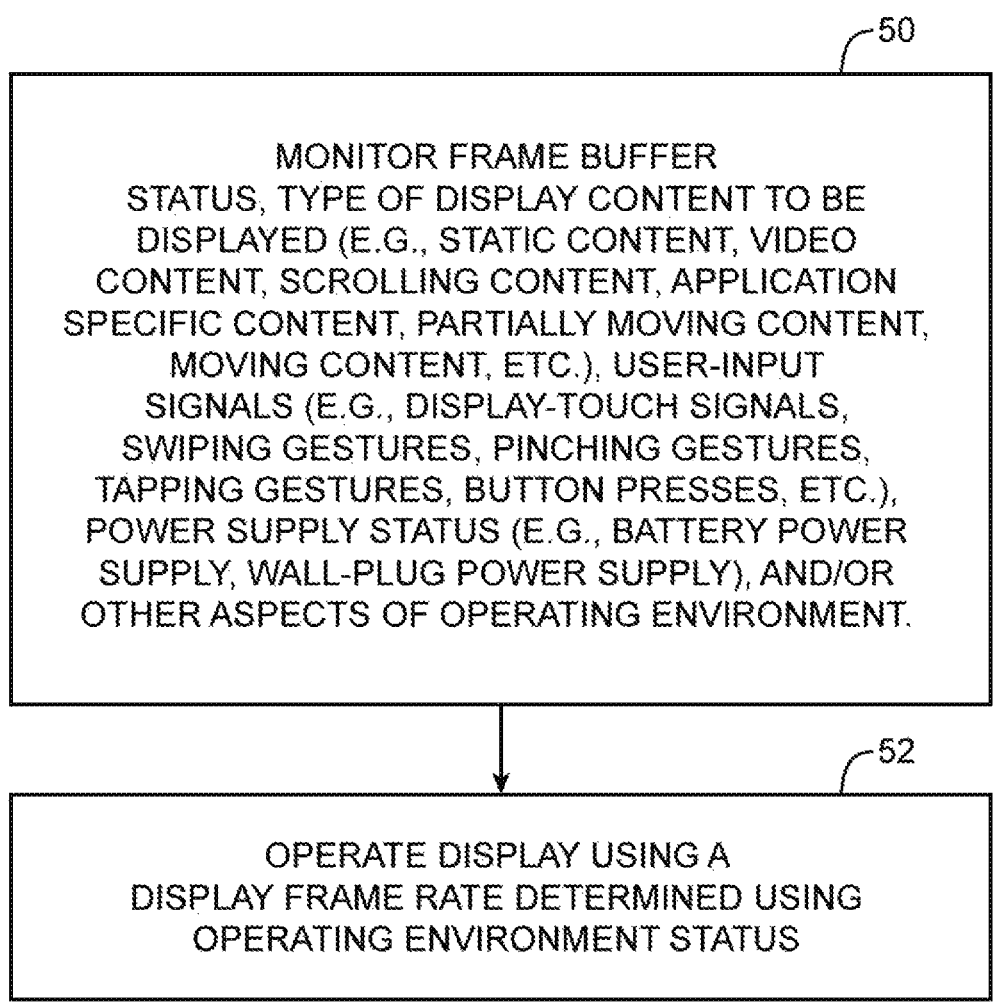
FIG. 3 is flow chart of illustrative steps involved in adjusting the frame rate of a variable frame rate display in an electronic device in response to other operational attributes of the electronic device in accordance with an embodiment of the present invention.

FIG. 3 shows illustrative steps involved in adjusting the frame rate for a display such as display 14 of FIG. 1 in response to information related to the operation of a device.

Device monitoring operations may be performed at step 50. The operations of step 50 may be performed using control circuitry such as storage and processing circuitry 12, display driver circuitry 20, standalone monitoring circuitry, and/or other device resources.

At step 50, control circuitry may be used to monitor the status of a frame buffer such a frame buffer 32, the type of display content to be displayed (e.g., static display content, dynamic display content, video display content, scrolling display content, application-specific display content, partially-moving display content, moving display content, etc.), user-input signals (e.g., display-touch signals, swiping gestures, pinching gestures, tapping gestures, button presses, etc.), device power supply status (e.g., a battery power supply or line power supply, and/or other aspects of the operating environment of the device.

At step 52, a display such as display 14 may be operated using a display frame rate that is determined in response to operational status information obtained at step 50.

Figure 4:
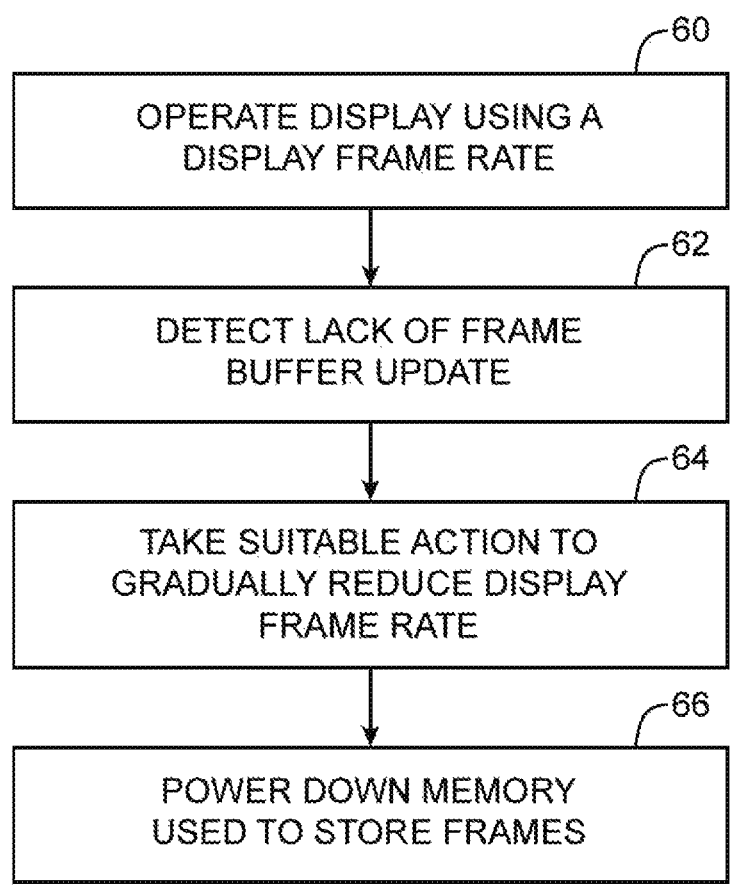
FIG. 4 is a flow chart of illustrative steps involved in frame buffer monitoring for an electronic device with a display in accordance with an embodiment of the present invention.

As an example of adjusting a display frame rate in response to monitored device operations, illustrative steps that may be used in adjusting a display frame rate in response to monitored frame buffer activity are shown in FIG. 4.

At step 60, a display may be operated using a display frame rate (e.g., by providing display signals to the array of display pixels at a frame rate of 24 frames per second, 60 frames per second, 25 frames per second, more than 25 frames per second, hundreds of frames per second, or less than 24 frames per second).

The display frame rate may be greater than or less than the rate at which new display data is provided to the frame buffer. For display data that is updated at a rate that is less than the display frame rate (e.g., static display content) display control circuitry may sometimes display the same display content from the frame buffer during multiple display refreshes. Circuitry 12 may therefore be used to monitor the activity of the frame buffer by, for example, monitoring the rate at which display data is updated (sometimes referred to herein as the frame buffer update rate).

At step 62, circuitry 12 may determine whether display data stored in a frame buffer such as frame buffer 32 (FIG. 2) has been updated. Circuitry 12 may, for example, determine that the frame buffer has not been updated (i.e., the circuitry may detect the lack of a frame buffer update).

At step 64, control circuitry such as control circuitry 12 may take suitable action to reduce the display frame rate in response to the detection of the lack of frame buffer update. Suitable action for reducing the display frame rate may include providing increased blanking data in display data being provided to frame buffer 32 such as increased vertical (i.e., inter-frame) blanking data or increased horizontal (i.e., inter-line) blanking data.

For example, during some modes of operation display frames including 1000 rows of display pixel data, each with 900 lines of active display data and 100 lines of vertical blanking data may be provided to display 14 at a frame rate of 60 Hz. In order to reduce the display frame rate to, for example, 30 Hz by increasing a vertical blanking interval, display 14 may be provided with display frames having 2000 lines of display pixel data that include 900 lines of active display data and 1100 lines of blanking data.

Each line of display pixel data may, for example, include 600 display pixel signals composed of active display data for a row of 550 display pixels and 50 horizontal blanking signals. In order to reduce the display frame rate to, for example, 30 Hz by increasing a horizontal blanking interval, display 14 may be provided with display frames having 1000 lines of display pixel data each including 1200 display pixel signals composed of active display data for 550 pixels and 650 blanking signals. However, these examples are merely illustrative. If desired, other methods of reducing the display frame rate may be used.

For example, suitable action for reducing the display frame rate may, if desired, include reducing a clock speed associated with timing circuitry in device 10.

At step 66, if desired, memory such as a portion of frame buffer 32 may be powered down in order to reduce power consumption while relatively little or no new display content is being generated.

Figure 5:
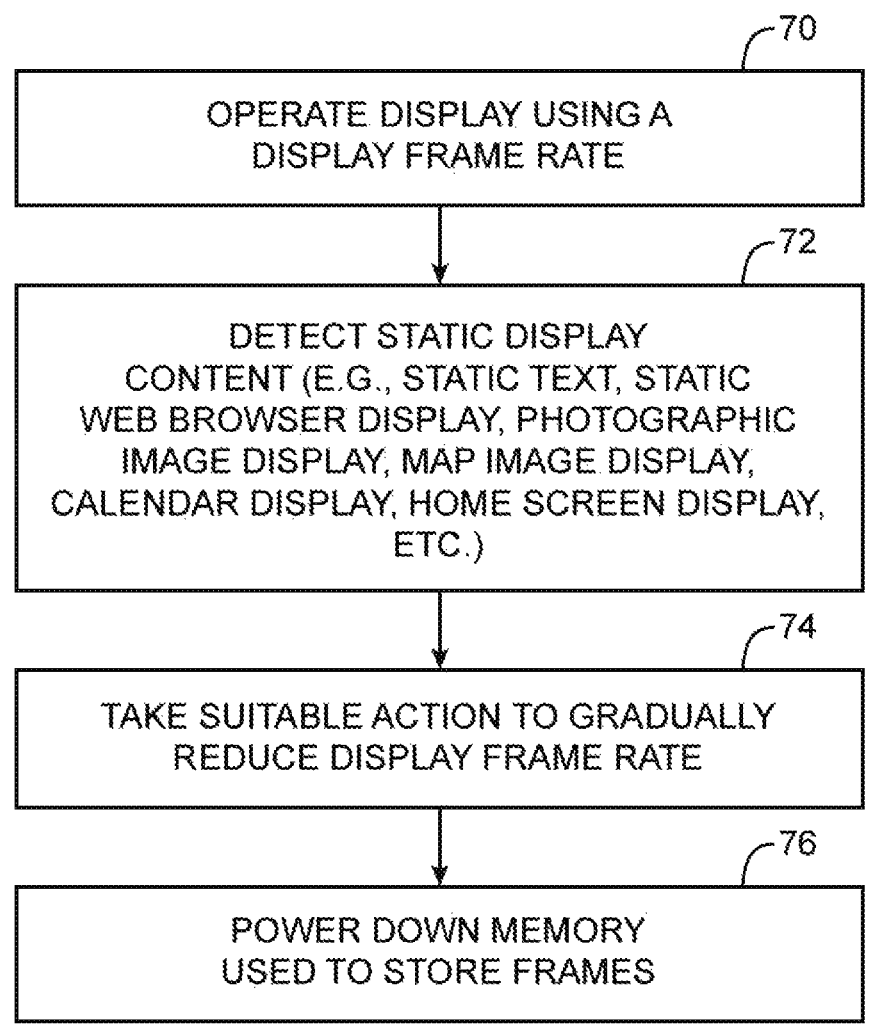
FIG. 5 is a flow chart of illustrative steps involved in display content monitoring for an electronic device with a display in accordance with an embodiment of the present invention.

As another example of adjusting a display frame rate in response to monitored device operations, illustrative steps that may be used in monitoring the type of display content (e.g., static display content or dynamic display content) being provided to a display and setting the display frame rate in response to the monitored display content are shown in FIG. 5.

At step 70, a display may be operated using a display frame rate.

At step 72, circuitry 12 may determine that the display content to be displayed is static display content. Static display content may include display content such as static text, static web browser content, photographic image content, map image content, calendar image content, or device operating system display content such a device home-screen display.

At step 74, control circuitry such as storage and processing circuitry 12 may take suitable action to reduce the display frame rate in response to determining that static display content is to be displayed. As described above in connection with FIG. 4, suitable action for reducing the display frame rate may include providing increased blanking data in display data to be displayed, reducing a clock speed associated with timing circuitry in the device or other suitable action for reducing the frame rate.

At step 76, if desired, memory such as a portion of frame buffer 32 may be powered down in order to reduce power consumption while no new display content is being generated.

Figure 6:
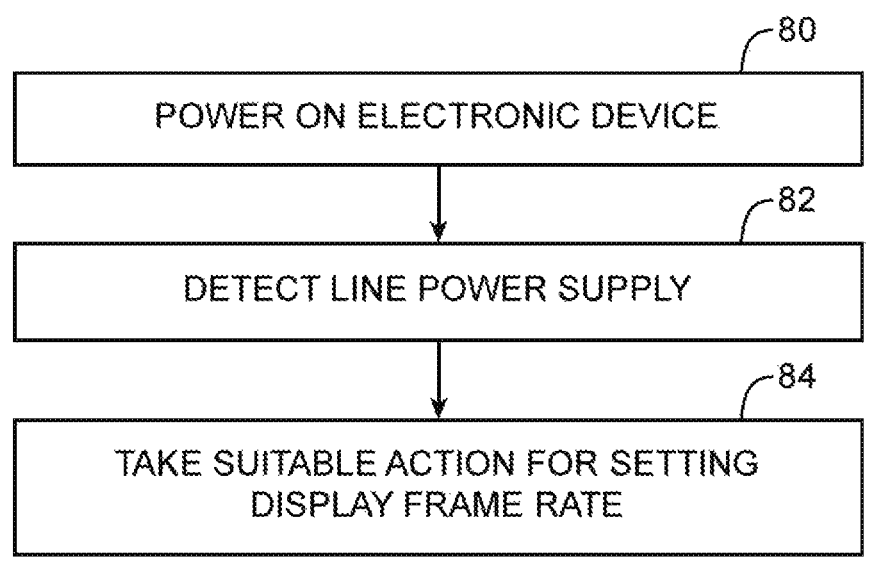
FIG. 6 is a flow chart of illustrative steps involved in power supply monitoring for an electronic device with a display in accordance with an embodiment of the present invention.

Illustrative steps that may be used in setting a display frame rate based on a monitored power-supply status of a device such as the presence of a line power supply source are shown in FIG. 6.

At step 80, a device such a device 10 may be powered on.

At step 82, circuitry that is monitoring the power-supply status of the device may detect power being supplied from a line power supply such as a power cable plugged into a wall plug or electrical outlet.

At step 84, control circuitry such as storage and processing circuitry 12 may take suitable action for setting the display frame rate in response to detecting power supplied from the power cable. Suitable action for setting the display frame rate may include increasing the display frame rate for increased perceived resolution, leaving a previously set display frame rate unchanged, or monitoring other device operating attributes (e.g., the display content to be displayed and/or a frame buffer refresh rate).

Figure 7:
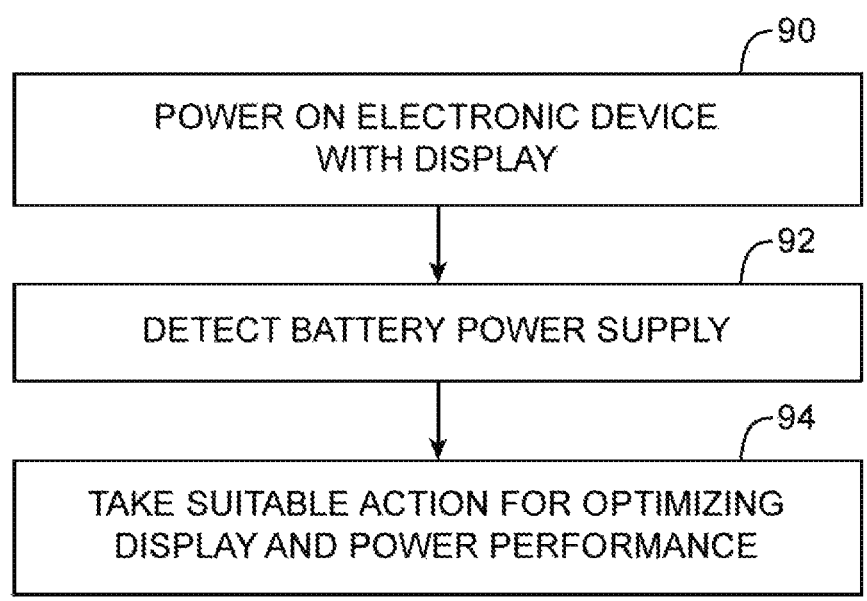
FIG. 7 is a flow chart of illustrative steps involved in display performance and power performance optimization for an electronic device with a display in accordance with an embodiment of the present invention.

Illustrative steps that may be used in setting a display frame rate based on the monitored power-supply status of a device such as detection of a battery power supply source are shown in FIG. 7.

At step 90, a device such a device 10 may be powered on.

At step 92, circuitry that is monitoring the power-supply status of the device may detect power being supplied from a battery such as a battery 34 in the device.

At step 94, control circuitry such as storage and processing circuitry 12 may take suitable action for setting the display frame rate in response to detecting power supplied from a battery. Suitable action for setting the display frame rate may include decreasing the display frame rate as described above in connection with (for example) FIG. 4 for reduced power consumption, leaving a currently set display frame rate unchanged, and/or monitoring other device operating attributes (e.g., the display content to be displayed and/or a frame buffer refresh rate).

Figure 8:
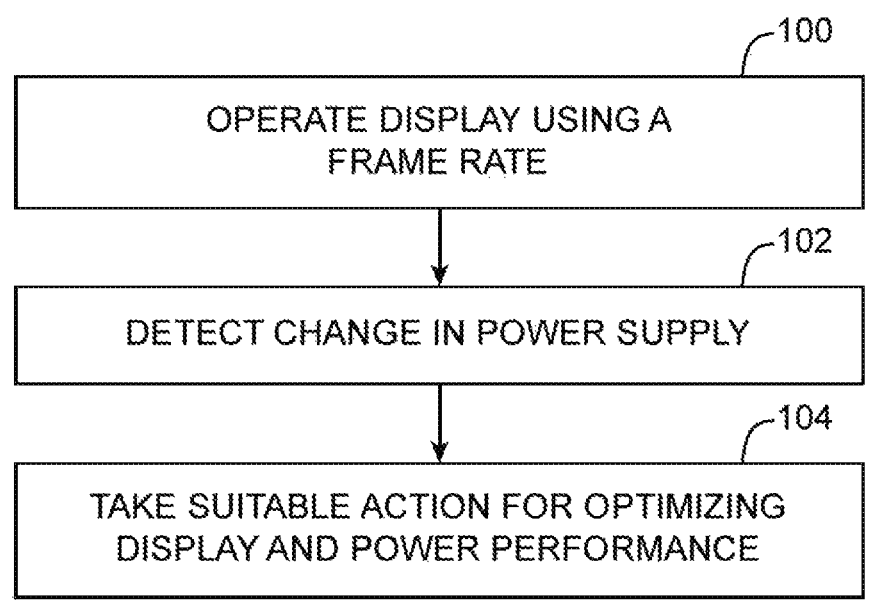
FIG. 8 is a flow chart of illustrative steps involved in display performance and power performance optimization during operation of an electronic device with a display in accordance with an embodiment of the present invention.

During operation of a device such as device 10, the power supply status of device 10 may change (e.g., the device may be plugged into a wall outlet or unplugged from a wall outlet). Illustrative steps that may be used in setting a display frame rate based on a detected change in the power-supply status of a device are shown in FIG. 8.

At step 100, a display such as display 14 may be operated using a frame rate.

At step 102, circuitry that is monitoring the power-supply status of the device may detect a change in the power supply for the device.

At step 104, control circuitry such as storage and processing circuitry 12 may take suitable action for optimizing power and display performance. Suitable action for optimizing power and display performance may include decreasing the display frame rate as described above in connection with (for example) FIG. 4 for reduced power consumption, leaving a currently set display frame rate unchanged, increasing the display frame rate for improved display performance, and/or monitoring other device operating attributes (e.g., the display content to be displayed and/or a frame buffer refresh rate).

Figure 9:
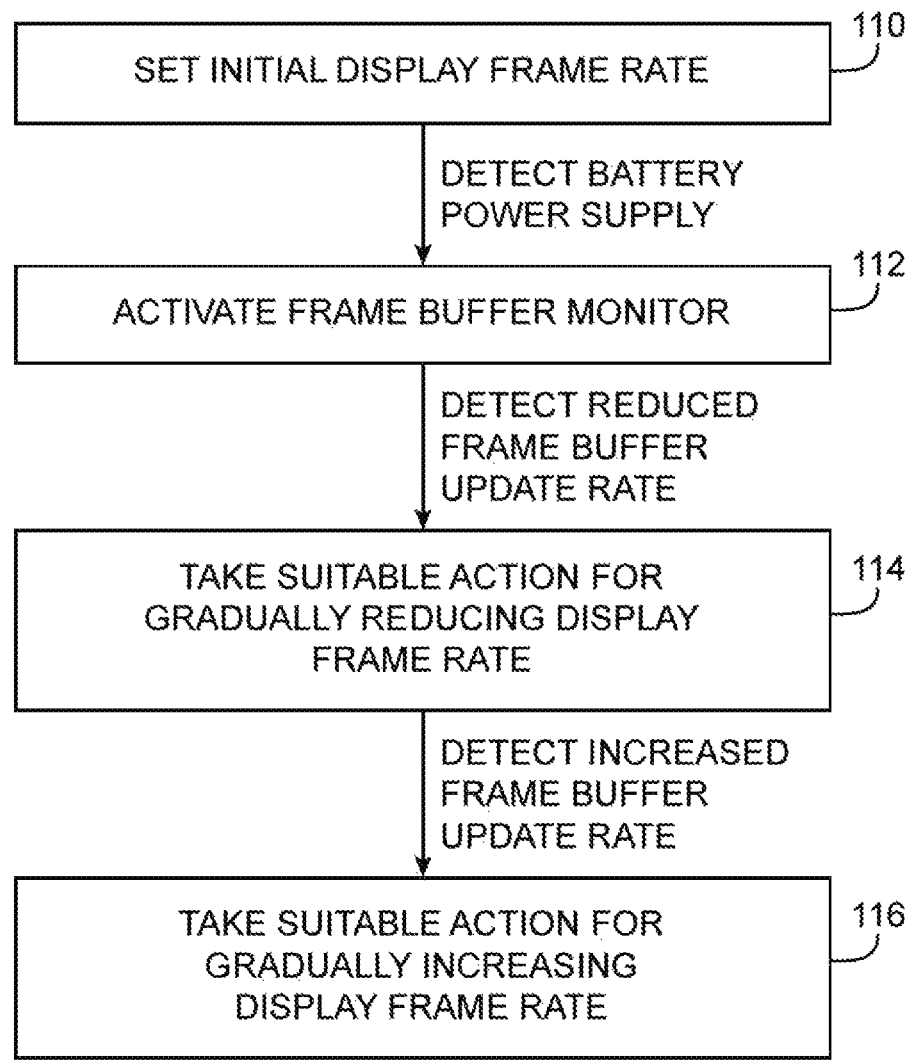
FIG. 9 is a flow chart of illustrative steps involved in adjusting the frame rate for a display in response to monitored frame buffer activity in accordance with an embodiment of the present invention.

If desired, display 14 may be operated using a display frame rate that is determined based on multiple operational attributes of the device. Illustrative steps that may be used in setting a display frame rate based on multiple operational attributes such as the device power supply status and frame buffer activity are shown in FIG. 9.

At step 110, an initial display frame rate may be set. The initial display frame rate may be set by control circuitry such as storage and processing circuitry 12 and/or display driver circuitry 20.

At step 112, in response to detecting a battery power supply source, a frame buffer monitor for monitoring the activity of a frame buffer such as frame buffer 32 (FIG. 2) may be activated. The frame buffer monitor may be implemented as a standalone monitoring circuit or may be formed as a portion of circuitry 12 or display driver circuitry 20 (FIG. 1).

At step 114, in response to detecting a reduced frame buffer update rate, control circuitry such as circuitry 12 may take suitable action for reducing the display frame rate as described above in connection with (for example) FIG. 4 for reduced power consumption.

At step 116, in response to detecting a subsequently increased frame buffer update rate, control circuitry such as circuitry 12 may take suitable action for increasing the display frame rate for improved display performance.

Figure 10:
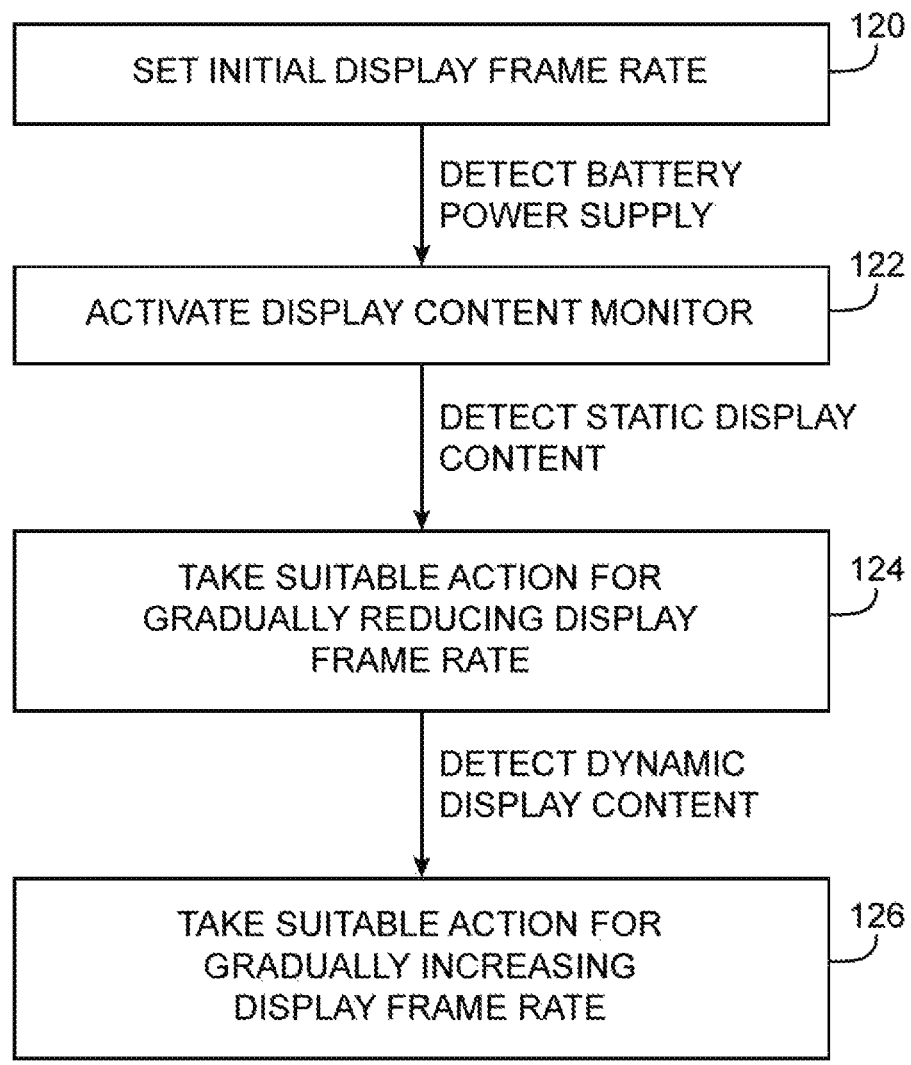
FIG. 10 is a flow chart of illustrative steps involved in adjusting the frame rate for a display in response to monitored display content in accordance with an embodiment of the present invention.

Illustrative steps that may be used in setting a display frame rate based on multiple operating environment attributes such as the device power supply status and the display content type are shown in FIG. 10.

At step 120, an initial display frame rate may be set.

At step 122, in response to detecting a battery power supply source, a display content monitor for monitoring display content may be activated. The display content monitor may be implemented as a standalone monitoring circuit or may be formed as a portion of circuitry 12 or display driver circuitry 20 (FIG. 1).

At step 124, in response to detecting static display content (e.g., static text, a photographic image, or other static display content) to be displayed, control circuitry such as circuitry 12 may take suitable action for reducing the display frame rate as described above in connection with (for example) FIG. 4 for reduced power consumption.

At step 126, in response to detecting subsequent dynamic display content (e.g., video display content, scrolling display content, etc.) to be displayed, control circuitry such as circuitry 12 may take suitable action for increasing the display frame rate for improved display performance.

Consider, as an example of a scenario in which the steps of FIGS. 9 and/or 10 may be used, a user of device 10 launching software such as a web browser running on circuitry 12 to access a web page. While operating the device using battery power, the user may view a web page for an extended period of time (e.g., while reading a news article). During that time, no new display content is generated and display 14 may be operated using a reduced display frame rate. The display frame rate may be gradually reduced to avoid noticeable changes to the user of device 10. When the user changes the display content (e.g., by scrolling to another portion of the web page or navigating to another web page or another software application), circuitry 12 may detect a change in the frame buffer content or display content and increase the display frame rate.

The perceived resolution of a display (i.e., the resolution perceived by a user of the device) depends on factors such as the actual resolution of the display (i.e., the density of display pixels), the type of display content being displayed, and the display frame rate. Some types of dynamic display content can induce a blurring effect related to the interaction of the display and the user's eye (sometimes referred to as retinal blur). One type of dynamic display content that is particularly retinal-blur inducing is display content in which some or all of the display content moves across the display with a common motion vector (sometimes referred to herein as common-vector motion).

Common-vector motion display content may include scrolling content, page-changing content, zooming content or other common-vector motion content. It may therefore be desirable to adjust the frame rate for a display when displaying dynamic display content such as common-vector motion display content.

Figure 11:
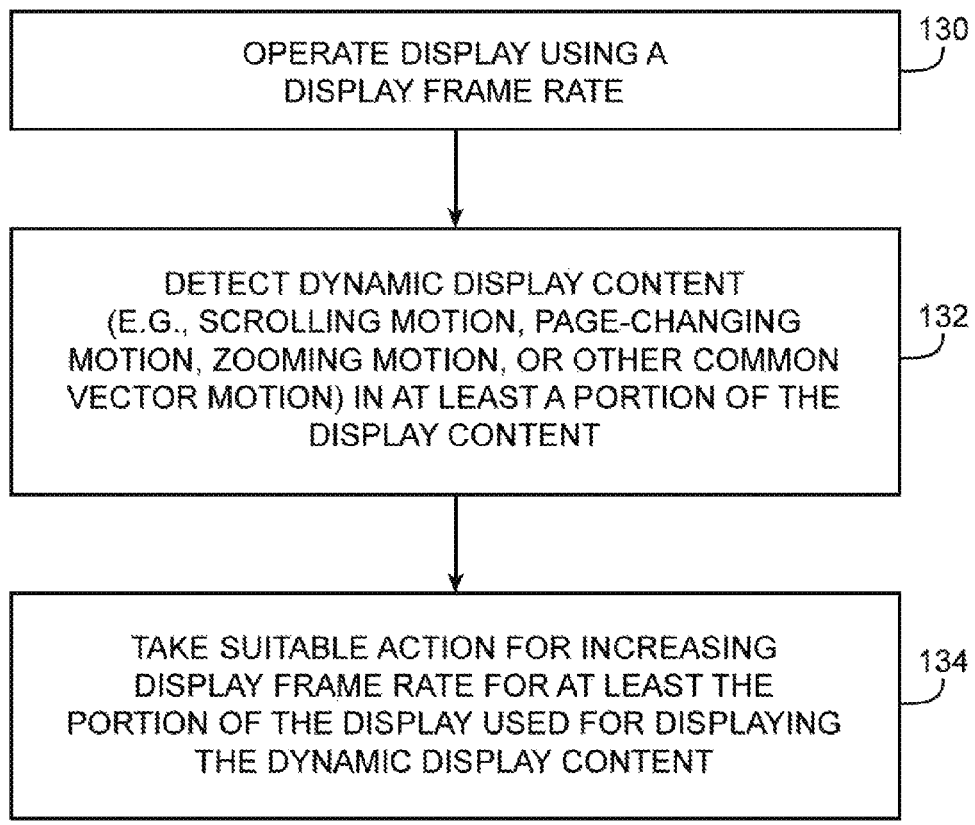
FIG. 11 is a flow chart of illustrative steps involved in adjusting the frame rate for a display in response to determining that dynamic display content is to be displayed in accordance with an embodiment of the present invention.

Illustrative steps that may be used in setting a display frame rate in response to detected dynamic display content are shown in FIG. 11.

At step 130, a display such as display 14 may be operated using a frame rate.

At step 132, circuitry that is monitoring the display content to be displayed may detect dynamic display content such as common-vector motion content in at least a portion of the display content.

At step 134, control circuitry such as circuitry 12 may take suitable action for increasing the display frame rate for improved display performance. The display circuitry may increase the frame rate to all of the display pixels of the display or may increase the frame rate to only a portion of the display pixels (e.g., the display pixels that will be used for displaying the dynamic display content).

In some scenarios, a software application running on circuitry such as circuitry 12 of device 10 (FIG. 1) may provide display content to display 14 that includes dynamic display content. Examples of this type of application-specific display content may include displaying a turning page of a book or magazine in an electronic book application or displaying text or other information overlaid on moving video images (e.g., images concurrently captured using a camera in the device).

Figure 12:
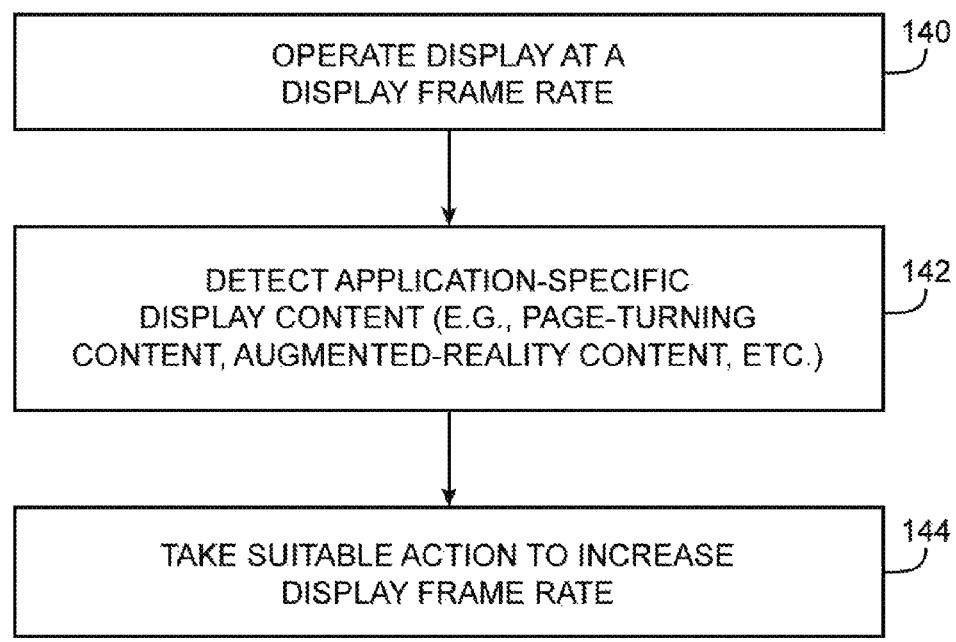
FIG. 12 is a flow chart of illustrative steps involved in adjusting the frame rate for a display in response to determining that application-specific display content is to be displayed in accordance with an embodiment of the present invention.

Illustrative steps that may be used in setting a display frame rate in response to application-specific display content are shown in FIG. 12.

At step 140, a display such as display 14 may be operated using a frame rate.

At step 142, circuitry that is monitoring the operation of the device may detect the launch of a specific application or a change in one or more settings of a specific application.

At step 144, control circuitry such as circuitry 12 may take suitable action for increasing the display frame rate for improved display performance. The display circuitry may increase the frame rate to all of the display pixels of the display or may increase the frame rate to only a portion of the display pixels (e.g., the display pixels that will be used for displaying the application-specific content).

Figure 13:
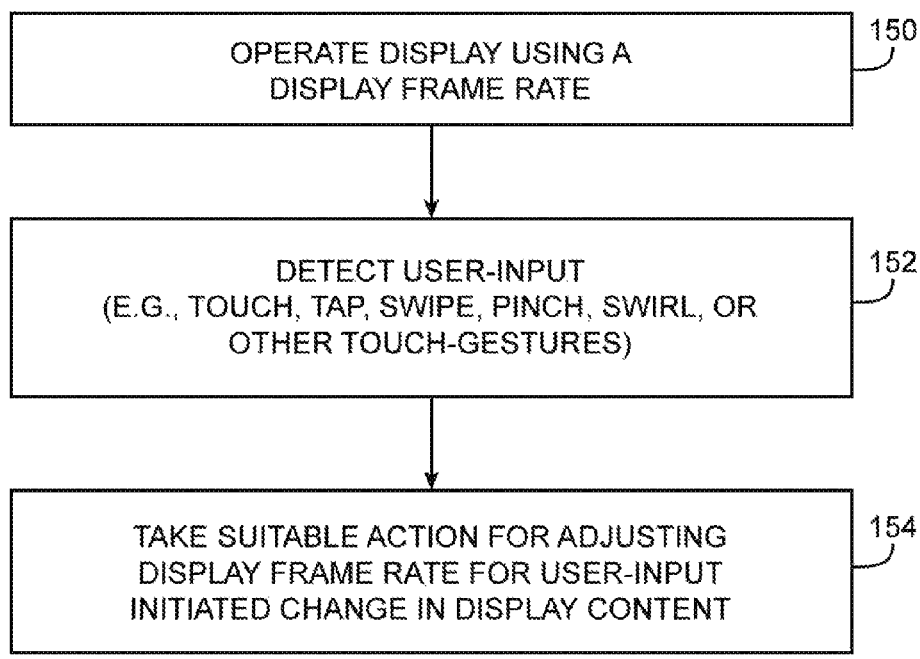
FIG. 13 is a flow chart of illustrative steps involved in adjusting the frame rate for a display in response to detecting user-input to the device in accordance with an embodiment of the present invention.

During operation of a device such as device 10, the user input may be provided to device 10 (e.g., using input-output components such as buttons, keyboards, or touch-sensor electrodes in the display) that generates a change in display content to be displayed. Examples of user-input that may generate a change in display content include swiping a finger across the display to scroll through text or pinching the display with multiple fingers to zoom into or out of a map or other image. Illustrative steps that may be used in setting a display frame rate based on detected user input to a device are shown in FIG. 13.

At step 150, a display such as display 14 may be operated using a frame rate.

At step 152, circuitry that is monitoring user-input components of the device may detect user input to the device.

At step 154, control circuitry such as circuitry 12 may take suitable action for increasing the display frame rate for improved display performance. The display circuitry may increase the frame rate to all of the display pixels of the display or may increase the frame rate to only a portion of the display pixels.

Figure 14:
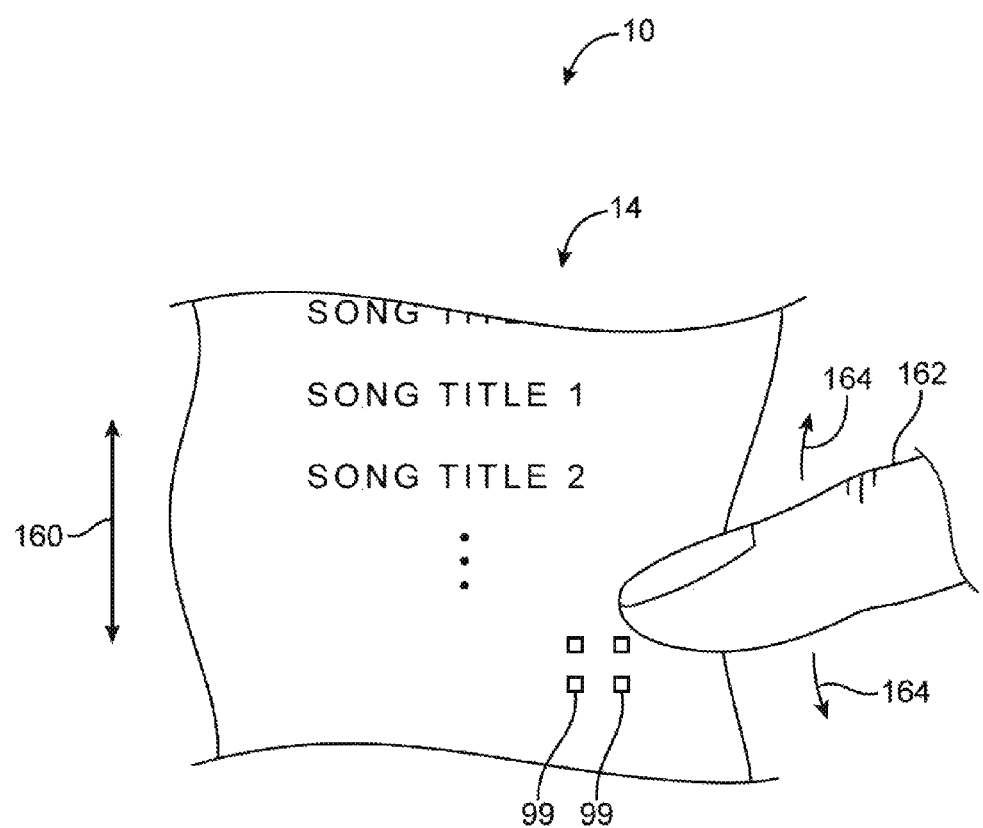
FIG. 14 is a diagram of an illustrative portion of a display showing how scrolling display applications and user-input touch-gestures may affect display content in accordance with an embodiment of the present invention.
Figure 15:
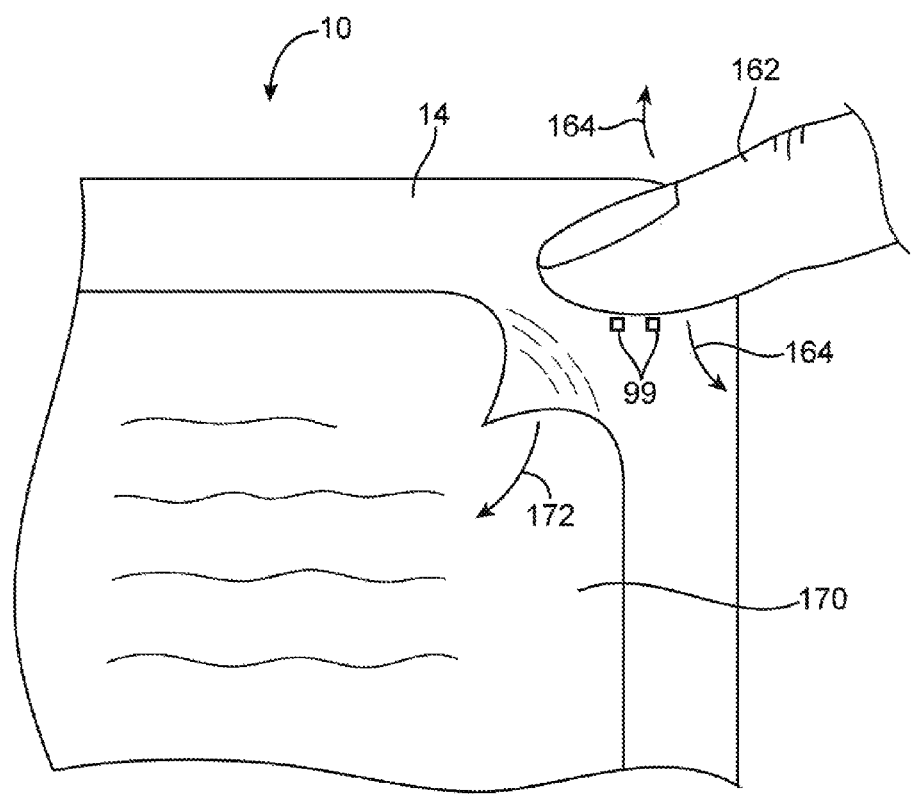
FIG. 15 is a diagram of an illustrative portion of a display showing how application-specific content and user-input touch-gestures may affect display content in accordance with an embodiment of the present invention.

FIGS. 14 and 15 show examples of dynamic display content that includes common-vector display content, application-specific display content and user-input affected display content that may be displayed on display 14 using an adaptively adjusted display frame rate.

As shown in FIG. 14, display 14 may display a text list such as a list of song titles when device 10 is running, for example, a music-player software application. A user may use a finger such as finger 162 to swipe touch sensitive components such as touch-sensor electrodes 99 in display 14 as indicated by arrows 164. Swiping touch-sensor electrodes 99 may cause the list of songs displayed on display 14 to scroll (e.g., to move with a common motion vector) as indicated by arrows 160. If desired, the frame rate for display 14 may be set in response to detection of any or all of the scrolling display content, user-input signals detected by electrodes 99 and the music-player-specific display content.

As shown in FIG. 15, display 14 may display a page such as page 170 of a virtual book when device 10 is running, for example, an electronic reader software application. A user may use a finger such as finger 162 to swipe touch sensitive components such as touch-sensor electrodes 99 in display 14 as indicated by arrows 164. Swiping touch-sensor electrodes 99 may cause page 170 to be changed on display 14 as indicated by arrow 172 (e.g., portions of page 170 may move across display 14 with a common motion vector). If desired, the frame rate for display 14 may be set in response to detection of any or all of the common-vector motion display content, user-input signals detected by electrodes 99 and the electronic-reader-specific display content.

Figure 16:
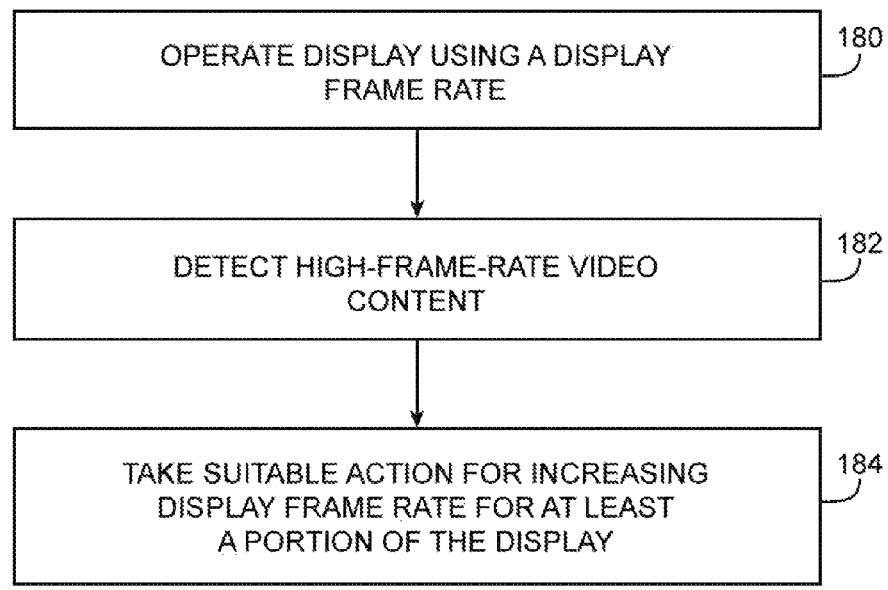
FIG. 16 is a flow chart of illustrative steps involved in adjusting the frame rate for a display in response to determining that video content is to be displayed in accordance with an embodiment of the present invention.

During operation of a device such as device 10, a portion of the display content to be displayed on display 14 may include embedded video content. The embedded video content may have a video frame rate that is greater than the frame rate being used to operate the array of display pixels in the display. Illustrative steps that may be used in setting a display frame rate based on this type of detected high-frame-rate video are shown in FIG. 16.

At step 180, a display such as display 14 may be operated using a frame rate.

At step 182, circuitry that is monitoring the display content may detect high-frame-rate video content to be displayed on at least a portion of the display.

At step 184, control circuitry such as circuitry 12 may take suitable action for increasing the display frame rate for improved display performance. The display circuitry may increase the frame rate for all of the display pixels of the display or may increase the frame rate for only a portion of the display pixels (e.g., the display pixels that will be used for displaying the high-frame-rate video content).

Figure 17:
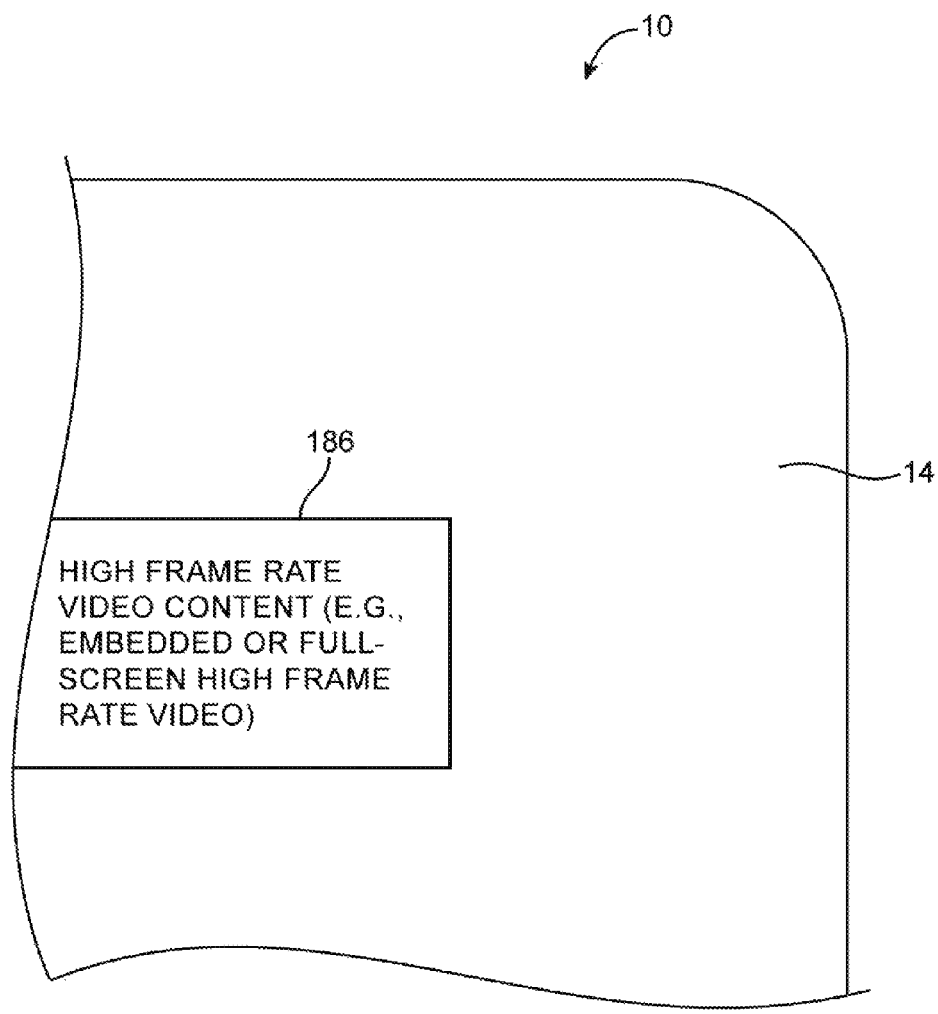
FIG. 17 is a diagram of an illustrative portion of a display showing how high-frame-rate video may be displayed on at least a portion of a display in accordance with an embodiment of the present invention.

As shown in FIG. 17, a portion such as portion 186 of display 14 may be used to display high-frame-rate video content such as full-screen or embedded video content in a web browser software application. The video content may have a video frame rate (e.g., a rate at which frames of video data are provided to device 10) that is greater than the frame rate being used to operate the array of display pixels in the display. If desired, the frame rate for display 14 may be set in response to detection of the high-frame-rate video content.

Figure 18:
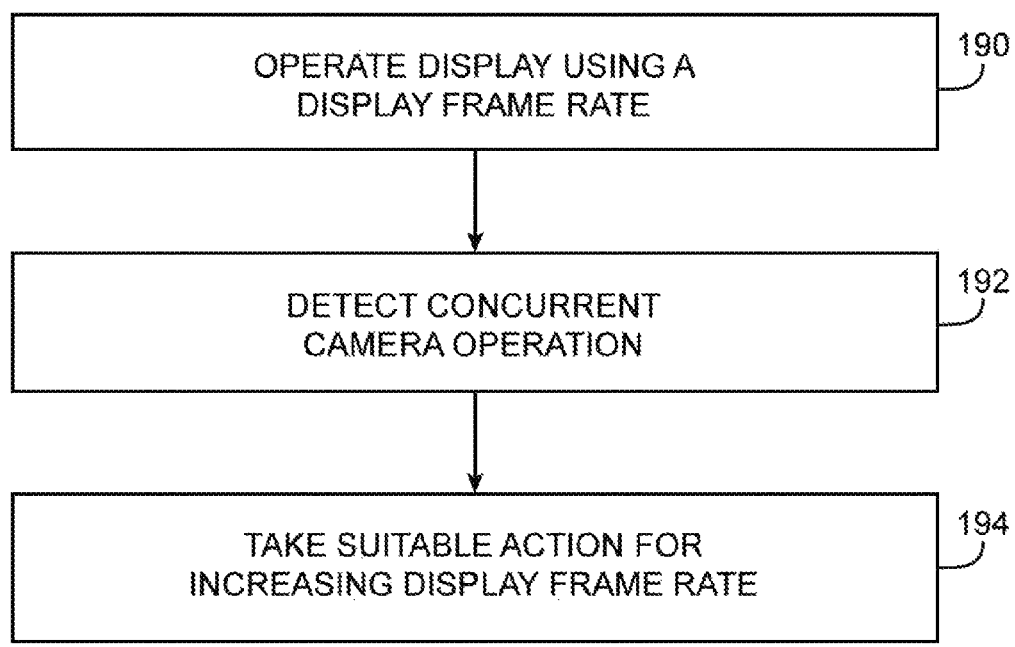
FIG. 18 is a flow chart of illustrative steps involved in adjusting the frame rate for a display in response to determining that additional components in the electronic device are being operated concurrently with the display in accordance with an embodiment of the present invention.

During operation of a device such as device 10, a camera may be used to capture image data of the environment surrounding the device while the captured image data is concurrently displayed on the display. In some scenarios such as scenarios in which device 10 is used to run an augmented-reality software application, additional content may be overlaid on the concurrently displayed captured images. Dynamic display content may be displayed on display 14 if the device is moved during capture and concurrent display of image data. Illustrative steps that may be used in setting a display frame rate based on detected concurrent camera operation are shown in FIG. 18.

At step 190, a display such as display 14 may be operated using a frame rate.

At step 192, circuitry that is monitoring the operational environment of the device may detect concurrent camera operation.

At step 194, control circuitry such as circuitry 12 may take suitable action for increasing the display frame rate for improved display performance. The display circuitry may increase the frame rate to all of the display pixels of the display or may increase the frame rate to only a portion of the display pixels (e.g., the display pixels that will be used for displaying images captured by the camera).

Figure 19:
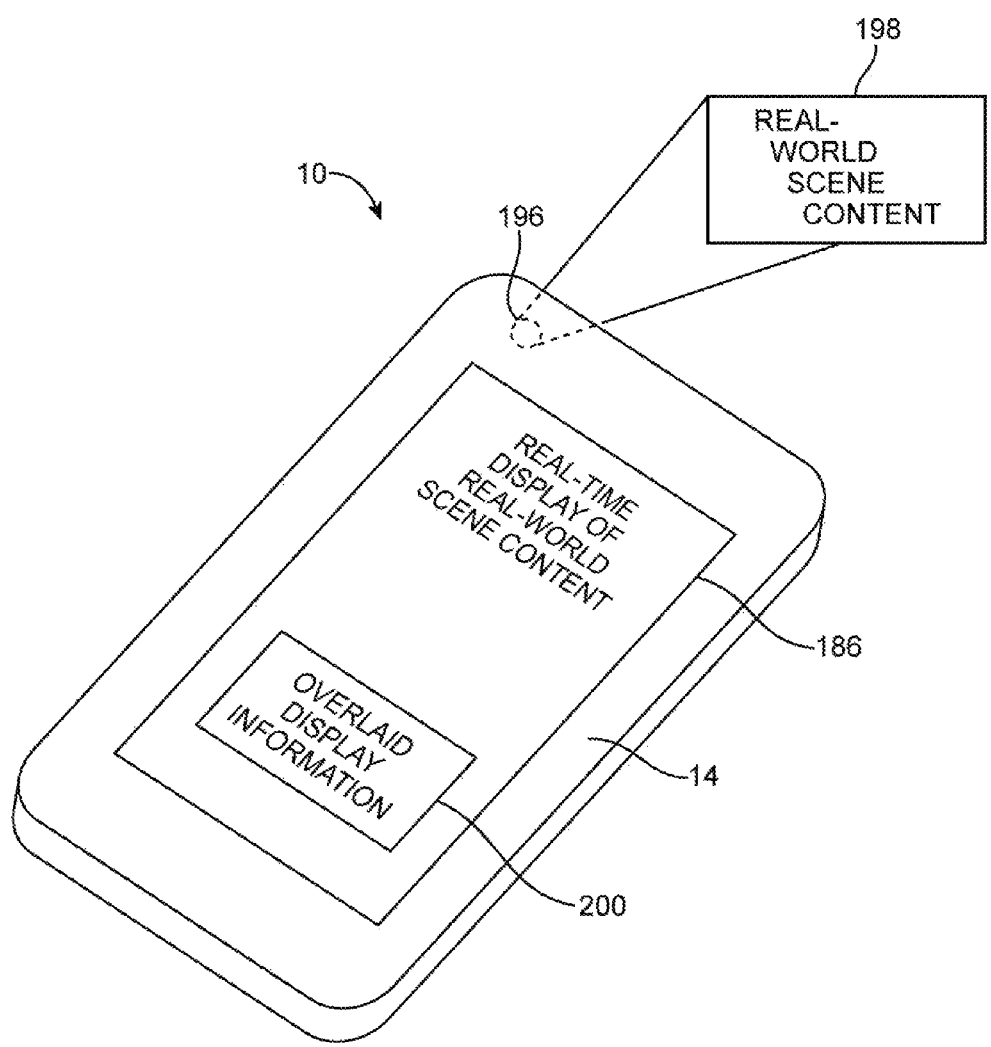
FIG. 19 is a perspective view of an illustrative electronic device having a display showing how concurrent operation of a camera may affect display content to be displayed in accordance with an embodiment of the present invention.

As shown in FIG. 19, a camera such as camera 196 in device 10 may be used while running, for example, an augmented-reality software application to capture images of real-world scene content 198. While capturing the images of scene content 198, the captured images may be concurrently displayed on a portion such as portion 186 of display 14. Circuitry such as circuitry 12 of FIG. 1 may be used to overlay additional display content such as overlaid display information 200 on the displayed captured images of scene 198. If desired, the frame rate for display 14 may be set in response to detection of the concurrent operation of the camera or in response to detection of augmented-reality-specific application content.

If desired, control circuitry such as control circuitry 12 of FIG. 1 may be configured to operate display 14 in a fixed frame rate mode or in a variable frame rate operational mode such as a frame rate optimization mode. The frame rate used to operate the array of display pixels in the display may remain fixed when the display is operated in the fixed frame rate operational mode and may be adjusted (e.g., increased or decreased) in response to monitored operation of the electronic device as described above in connection with FIGS. 1-21 when the display is operated in the variable frame rate operational mode.

Figure 20:
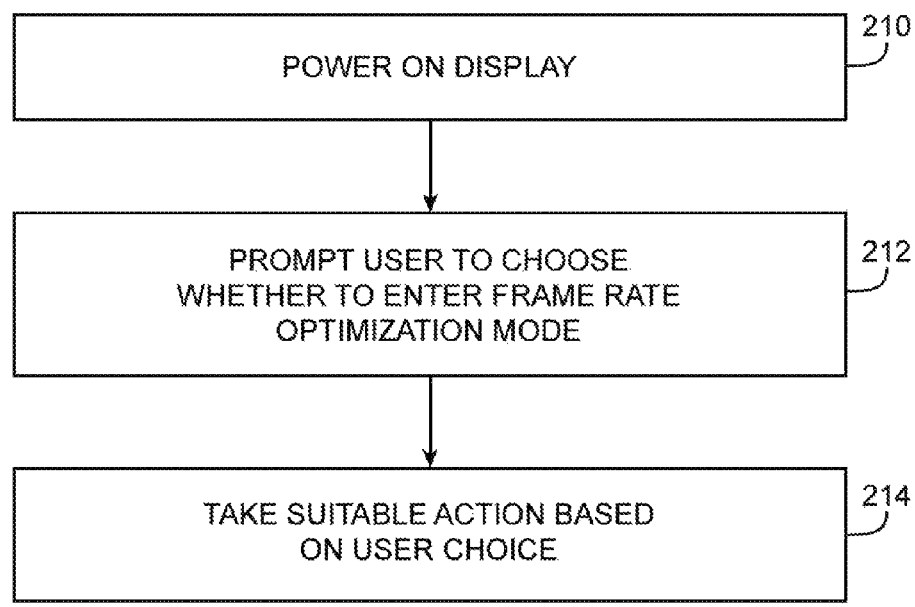
FIG. 20 is a flow chart of illustrative steps involved in operating an electronic device with a display having an optional variable frame rate mode in accordance with an embodiment of the present invention.

A user of a device such as device 10 may be prompted to decide whether to enter the frame rate optimization mode. Illustrative steps that may be used in prompting a user of device 10 to decide whether to operate the display in a fixed or variable frame rate operational mode are shown in FIG. 20.

At step 210, a display such as display 14 may be powered on.

At step 212, circuitry that is operating the display may prompt a user to decide whether to enter a variable frame rate operational mode such as a frame rate optimization mode.

At step 214, control circuitry such as circuitry 12 may take suitable action in response to the user choice. Suitable action may include entering a fixed frame rate mode of operation if the user chooses not to enter the frame rate optimization mode or may include entering the variable frame rate optimization mode if the user chooses to enter the variable frame rate optimization mode.

Figure 21:
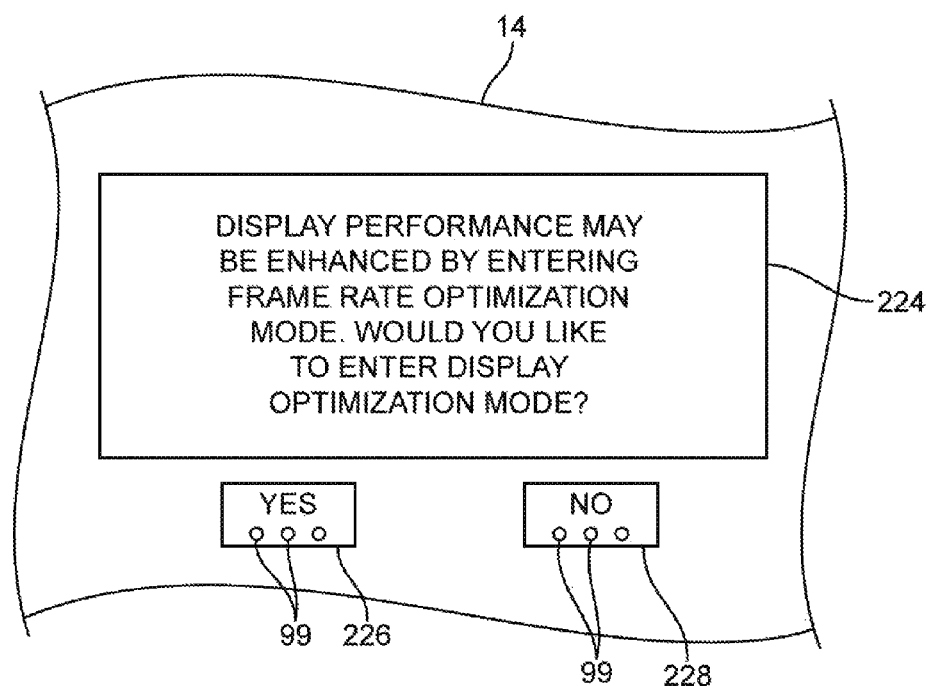
FIG. 21 is a diagram of an illustrative portion of a display showing how a user may be prompted to choose whether to enter a variable frame rate operational mode in accordance with an embodiment of the present invention.

As shown in FIG. 21, a user prompt such as prompt 224 may be displayed on a portion of display 14 to provide a text question to the user of the device to choose whether or not to enter the frame rate optimization mode. The user may, as an example, use touch-sensor electrodes 99 in the display to enter an affirmative response using virtual button 226 or a negative response using virtual button 228. However, this is merely illustrative. Any user input component may be used to input a response to prompt 224. In response to an affirmative response, circuitry such as circuitry 12 of FIG. 1 may begin actively adjusting (e.g., increasing or decreasing) the frame rate for display 14 in response to monitored operation of the electronic device as described above in connection with FIGS. 1-21.

The foregoing is merely illustrative of the principles of this invention and various modifications can be made by those skilled in the art without departing from the scope and spirit of the invention.

What is claimed is:

1. A system, comprising:
a display having an array of display pixels and display driver circuitry configured to operate the display pixels at a display frame rate;
a camera configured to capture image data to be displayed using the display pixels; and
control circuitry configured to monitor operation of at least a portion of the system including determining that dynamic display content is to be displayed on the array of display pixels by the display driver circuitry, wherein the control circuitry is configured to adjust the display frame rate based at least in part on a variable frame rate mode, wherein the dynamic display content corresponds to augmented-reality content overlaid on data captured from the camera, and wherein the display frame rate is based at least in part on the augmented-reality content.

2. The system of claim 1, wherein the control circuitry comprises a frame buffer for storing display data to be displayed on the display, wherein the control circuitry is configured to monitor the display data in the frame buffer and to adjust the display frame rate based on the monitored display data.

3. The system of claim 1, wherein the control circuitry comprises a frame buffer for storing display data to be displayed on the display, wherein the control circuitry is configured to monitor activity in the frame buffer and to adjust the display frame rate based on the monitored frame buffer activity.

4. The system of claim 1, wherein the control circuitry is configured to determine whether the system is being powered by battery power or line power and is configured to adjust the display frame rate based on whether the control circuitry is being powered by battery power or line power.

5. The system of claim 1, wherein the control circuitry is configured to receive user input from a user and wherein the control circuitry is configured to adjust the display frame rate based on the user input.

6. The system of claim 5, further comprising touch-sensor electrodes in the display, wherein the control circuitry is configured to receive the user input using the touch-sensor electrodes.

7. The system of claim 1, wherein the control circuitry is configured to adjust the display frame rate based at least in part on detected movement of the camera.

8. A method of controlling a display having an array of display pixels and display driver circuitry configured to display content on the array of display pixels at a display frame rate, comprising:
with control circuitry:
determining that display content is to be displayed on the array of display pixels by the display driver circuitry;
monitoring a change in a scene captured by a camera;
detecting movement of the camera;
displaying augmented reality content with the scene using the display pixels;
adjusting the display frame rate based at least in part on the detected movement of the camera based at least in part on the monitored change in the scene by the camera;
determining that static display content is to be displayed on the array of display pixels by a display driver circuitry by monitoring activity in a frame buffer that is periodically updated with display data to be displayed on the array of display pixels;
detecting a lack of a frame buffer update; and
upon detecting a lack of a frame buffer update, reducing the display frame rate, wherein the display frame rate is adjusted based at least in part on detection that dynamic display content is to be displayed on the array of display pixels by detecting when video content that has a video display frame rate that is greater than the display frame rate is to be displayed on the array of display pixels.

9. The method of claim 8, wherein reducing the display frame rate includes reducing the display frame rate by increasing a horizontal blanking interval between portions of display frames.

10. The method of claim 8, wherein determining that static display content is to be displayed on the array of display pixels by the display driver circuitry comprises determining that static display content is to be displayed on the array of display pixels by display driver circuitry using a portion of storage and processing circuitry external to the display.

11. The method of claim 8, wherein detecting movement comprises detecting common-vector motion content to be displayed.

12. The method of claim 8, wherein detecting the video content to be displayed on the array of display pixels comprises detecting embedded video content that is embedded in a portion of the content that is associated with a web browser software application.

13. The method of claim 12, wherein increasing the display frame rate comprises increasing the display frame rate for only a portion of the array of display pixels corresponding to the embedded video content.

14. An electronic device, comprising:
a camera configured to capture a scene;
a variable display frame rate display configured to operate in a variable display frame rate display operating mode displaying content using a display frame rate and to display the scene with additional augmented-reality display content; and
control circuitry configured circuitry configured to operate the display in either the variable display frame rate display operating mode or the fixed display frame rate operating mode, wherein in the variable frame rate is based at least in part on whether the augmented-reality display content is being displayed.

15. The electronic device of claim 14, wherein the circuitry is configured to alter the display frame rate of the variable display frame rate display in response to detecting whether static or dynamic display content is to be displayed on the variable display frame rate display when the display is operating in the variable display frame rate operating mode.

16. The electronic device of claim 14, wherein adjusting the display frame rate comprises increasing the display frame rate for only a portion of the variable display corresponding to the augmented-reality display content.

17. The electronic device of claim 14, wherein the control circuitry is configured to adjust the display frame rate based on whether the electronic device is powered by battery power or AC line power.

18. The electronic device of claim 14, comprising an input device, wherein the control circuitry is configured to:
   cause the variable display frame rate display to request a choice between the variable display frame rate operating mode and a fixed display frame rate operating mode; and
   obtain a selection using the input device, wherein adjusting the variable display frame rate is based at least in part on the selection.

* * * * *

UNITED STATES PATENT AND TRADEMARK OFFICE
CERTIFICATE OF CORRECTION

PATENT NO.       : 10,019,086 B2
APPLICATION NO.  : 15/167775
DATED            : July 10, 2018
INVENTOR(S)      : Brijesh Tripathi et al.

It is certified that error appears in the above-identified patent and that said Letters Patent is hereby corrected as shown below:

In the Claims

Column 14, Line 61 (Claim 14) - delete second occurrence of "circuitry configured".

Signed and Sealed this
Eleventh Day of December, 2018

Andrei Iancu
*Director of the United States Patent and Trademark Office*